United States Patent
Lee et al.

(10) Patent No.: US 9,444,828 B2
(45) Date of Patent: Sep. 13, 2016

(54) NETWORK INTRUSION DETECTION APPARATUS AND METHOD USING PERL COMPATIBLE REGULAR EXPRESSIONS-BASED PATTERN MATCHING TECHNIQUE

(71) Applicant: ELECTRONICS AND TELECOMMUNICATIONS RESEARCH INSTITUTE, Daejeon (KR)

(72) Inventors: Sung-Ryoul Lee, Daejeon (KR); Young-Han Choi, Daejeon (KR); Jung-Hee Lee, Daejeon (KR); Byung-Chul Bae, Daejeon (KR); Hyung-Geun Oh, Daejeon (KR); Ki-Wook Sohn, Daejeon (KR)

(73) Assignee: ELECTRONICS AND TELECOMMUNICATIONS RESERACH INSTITUTE, Daejeon (KR)

( * ) Notice: Subject to any disclaimer, the term of this patent is extended or adjusted under 35 U.S.C. 154(b) by 295 days.

(21) Appl. No.: 14/023,635

(22) Filed: Sep. 11, 2013

(65) Prior Publication Data

US 2014/0123288 A1  May 1, 2014

(30) Foreign Application Priority Data

Nov. 1, 2012 (KR) .................. 10-2012-0123019

(51) Int. Cl.
*H04L 29/06* (2006.01)
(52) U.S. Cl.
CPC ................ *H04L 63/1416* (2013.01)
(58) Field of Classification Search
CPC .... H04L 63/1441; H04L 12/28; H04L 12/30
See application file for complete search history.

(56) References Cited

U.S. PATENT DOCUMENTS

| 2008/0034433 A1 | 2/2008 | Kim et al. |
| 2010/0131935 A1 | 5/2010 | Wang |
| 2010/0198850 A1 | 8/2010 | Cytron et al. |

FOREIGN PATENT DOCUMENTS

KR   10-0772523 B1   11/2007

OTHER PUBLICATIONS

Muhammad Jamshed et al., "Kargus: a Highly-scalable Software-based Intrusion Detection System," Proceedings of ACM CCS, 2012.
Giorgos Vasiliadis et al., "Regular Expression Matching on Graphics Hardware for Intrusion Detection," RAID 2009 Proceedings of the 12th International Symposium on Recent Advances in Intrusion Detection, 2009.

*Primary Examiner* — Saleh Najjar
*Assistant Examiner* — Devin Almeida
(74) *Attorney, Agent, or Firm* — LRK Patent Law Firm

(57) ABSTRACT

A network intrusion detection apparatus and method that perform Perl Compatible Regular Expressions (PCRE)-based pattern matching on the payloads of packets using a network processor equipped with a Deterministic Finite Automata (DFA) engine. The network intrusion detection apparatus includes a network processor core for receiving packets from a network, and transmitting payloads of the received packets to a Deterministic Finite Automata (DFA) engine. A detection rule converter converts a PCRE-based detection rule, preset to detect an attack packet, into a detection rule including a pattern to which only PCRE grammar corresponding to the DFA engine is applied. The DFA engine performs PCRE pattern matching on the payloads of the packets based on the detection rule converted by the detection rule converter.

16 Claims, 3 Drawing Sheets

NETWORK INTRUSION DETECTION APPARATUS AND METHOD USING PERL COMPATIBLE REGULAR EXPRESSIONS-BASED PATTERN MATCHING TECHNIQUE

CROSS REFERENCE TO RELATED APPLICATION

This application claims the benefit of Korean Patent Application No. 10-2012-0123019, filed on Nov. 1, 2012, which is hereby incorporated by reference in its entirety into this application.

BACKGROUND OF THE INVENTION

1. Technical Field

The present invention relates generally to a network intrusion detection apparatus and method using a Perl Compatible Regular Expressions (PCRE)-based pattern matching technique and, more particularly, to a network intrusion detection apparatus and method that perform PCRE-based pattern matching on the payloads of packets using a network processor equipped with a Deterministic Finite Automata (DFA) engine.

2. Description of the Related Art

Harmful traffic denotes attack traffic which causes a system to malfunction when a recipient receives the traffic, traffic which carries attack information or is unnecessary for a normal network flow, or traffic which is necessary for a data flow or belongs to a normal packet, but performs the action of interfering with the flow of normal network communication of a recipient due to the generation of an excessively large number of normal packets or the action of interrupting a network connection. When harmful traffic enters the computer of a user over a network, a problem such as the deterioration of computer performance arises. Therefore, ways to block such harmful traffic have continually been researched.

In order to detect and prevent malicious attacks on a network and prevent such a malicious attack, paper by Giorgos Vasiliadis et al., entitled 'Regular Expression Matching on Graphics Hardware for Intrusion Detection' (RAID 2009 Proceedings of the 12th International Symposium on Recent Advances in Intrusion Detection, Pages 265-283) proposes technology that uses a Peripheral Component Interconnect (PCI)-based exclusive Perl Compatible Regular Expressions (PCRE) acceleration engine so as to perform fast PCRE-based pattern matching on large-capacity Internet Protocol (IP) traffic.

However, when the PCI-based exclusive PCRE acceleration engine is used to perform PCRE pattern matching, a problem arises in that performance is decreased due to PCI communication for transmitting packets and the results of matching between a general-purpose Central Processing Unit (CPU) which receives and analyzes packets, and the PCRE acceleration engine.

Meanwhile, even when character string (content) matching is performed using a network processor equipped with a separate Deterministic Finite Automata (DFA) engine, the DFA engine performs simple character string matching, and a network processor core performs the reception and analysis of packets and matching of PCRE patterns. Accordingly, a problem arises in that there is a limitation in processing large-capacity IP traffic in a high-speed network without causing loss. In particular, PCRE pattern matching using a PCRE library on the network processor core is the principal cause for the reduction of the performance of the network processor.

SUMMARY OF THE INVENTION

Accordingly, the present invention has been made keeping in mind the above problems occurring in the prior art, and an object of the present invention is to provide technology which performs PCRE pattern matching using a network processor so as to detect intrusion of large-capacity IP traffic on a high-speed network.

Another object of the present invention is to provide technology in which a separate DFA engine performs PCRE-pattern matching based on hardware and a network processor core performs PCRE-pattern matching based on software using a PCRE library when PCRE pattern matching is performed using the network processor equipped with the DFA engine, thus improving the processing speed of a network processor.

In accordance with an aspect of the present invention to accomplish the above objects, there is provided a network intrusion detection apparatus including a network processor core for receiving packets from a network, and transmitting payloads of the received packets to a Deterministic Finite Automata (DFA) engine; a detection rule converter for converting a Perl Compatible Regular Expressions (PCRE)-based detection rule, preset to detect an attack packet, into a detection rule including a pattern to which only PCRE grammar corresponding to the DFA engine is applied; and the DFA engine for performing PCRE pattern matching on the payloads of the packets based on the detection rule converted by the detection rule converter.

Preferably, the detection rule converter may extract the pattern to which only the PCRE grammar corresponding to the DFA engine is applied, from all patterns of the PCRE-based detection rule, add the extracted pattern to the PCRE-based detection rule, and then convert the PCRE-based detection rule into the detection rule including the pattern to which only the PCRE grammar corresponding to the DFA engine is applied.

Preferably, the DFA engine may perform PCRE pattern matching on the payloads of the packets based on the pattern to which only the PCRE grammar corresponding to the DFA engine is applied and which is added to the PCRE-based detection rule.

Preferably, the network processor core may perform PCRE pattern matching only on a payload of a packet on which PCRE pattern matching has been successfully performed by the DFA engine.

Preferably, the network processor core may be configured to, if PCRE pattern matching has been successfully performed by the DFA engine, and a pattern to which PCRE grammar, not corresponding to the DFA engine, is applied is present in the PCRE-based detection rule, perform PCRE pattern matching only on a payload of a packet on which PCRE pattern matching has been successfully performed by the DFA engine among the payloads of the packets received from the network.

Preferably, the network processor core may not perform PCRE pattern matching on the payloads of the packets received from the network if PCRE pattern matching has been unsuccessfully performed by the DFA engine.

Preferably, the network processor core may perform PCRE pattern matching on the payloads of the packets received from the network using a PCRE library.

Preferably, the detection rule converter may assign a separate identifier to the extracted pattern so as to distinguish the extracted pattern from patterns to which PCRE grammar, not corresponding to the DFA engine, is applied, and add a resulting pattern to the PCRE-based detection rule.

In accordance with another aspect of the present invention to accomplish the above objects, there is provided a network intrusion detection method including converting a Perl Compatible Regular Expressions (PCRE)-based detection rule, preset to detect an attack packet, into a detection rule including a pattern to which only PCRE grammar corresponding to a DFA engine is applied; receiving, by a network processor core, packets from a network; transmitting, by the network processor core, payloads of the received packets to the DFA engine; and performing, by the DFA engine, PCRE pattern matching on the payloads of the packets based on the converted detection rule.

Preferably, converting the PCRE-based detection rule into the detection rule including the pattern to which only PCRE grammar corresponding to the DFA engine is applied may include extracting the pattern to which only the PCRE grammar corresponding to the DFA engine is applied, from all patterns of the PCRE-based detection rule; and adding the extracted pattern to the PCRE-based detection rule, and then converting the PCRE-based detection rule into the detection rule including the pattern to which only the PCRE grammar corresponding to the DFA engine is applied.

Preferably, performing, by the DFA engine, the PCRE pattern matching on the payloads of the packets may be configured to perform PCRE pattern matching on the payloads of the packets based on the pattern to which only the PCRE grammar corresponding to the DFA engine is applied and which is added to the PCRE-based detection rule.

Preferably, the network intrusion detection may further include performing, by the network processor core, PCRE pattern matching only on a payload of a packet on which PCRE pattern matching has been successfully performed by the DFA engine.

Preferably, performing, by the network processor core, the PCRE pattern matching only on the payload of the packet on which PCRE pattern matching has been successfully performed by the DFA engine may be configured to, if PCRE pattern matching has been successfully performed by the DFA engine, and a pattern to which PCRE grammar, not corresponding to the DFA engine, is applied is present in the PCRE-based detection rule, perform PCRE pattern matching only on a payload of a packet on which PCRE pattern matching has been successfully performed by the DFA engine among the payloads of the packets received from the network.

Preferably, performing, by the network processor core, the PCRE pattern matching only on the payload of the packet on which PCRE pattern matching has been successfully performed by the DFA engine may be configured such that, if PCRE pattern matching has been unsuccessfully performed by the DFA engine, PCRE pattern matching is not performed on the payloads of the packets received from the network.

Preferably, performing, by the network processor core, the PCRE pattern matching only on the payload of the packet on which PCRE pattern matching has been successfully performed by the DFA engine may be configured to perform PCRE pattern matching on the payloads of the packets received from the network using a PCRE library.

Preferably, adding the extracted pattern to the PCRE-based detection rule and then converting the PCRE-based detection rule into the detection rule including the pattern to which only the PCRE grammar corresponding to the DFA engine is applied may be configured to assign a separate identifier to the extracted pattern so as to distinguish the extracted pattern from patterns to which PCRE grammar, not corresponding to the DFA engine, is applied, and add a resulting pattern to the PCRE-based detection rule.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
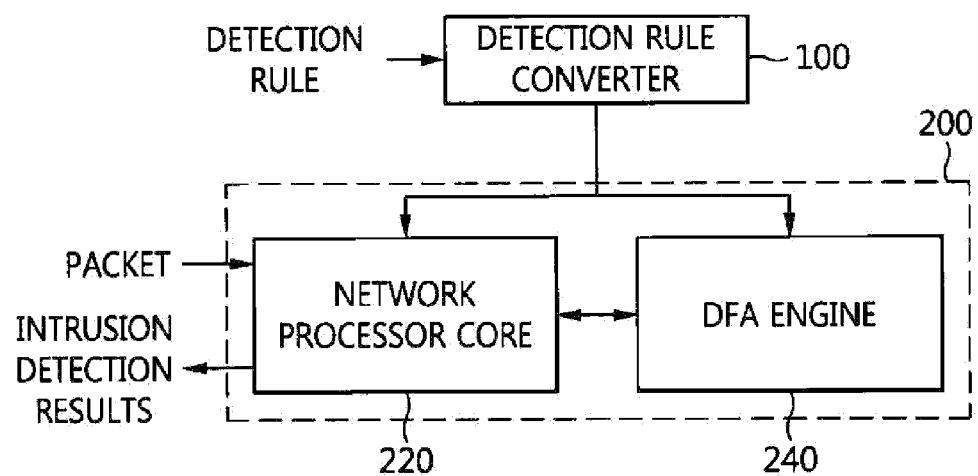
FIG. 1 is a diagram showing the configuration of a network intrusion detection apparatus using a PCRE-based pattern matching technique according to the present invention.

Hereinafter, a network intrusion detection apparatus and method using a PCRE-based pattern matching technique according to the present invention will be described in detail with reference to the attached drawings. Prior to the detailed description of the present invention, it should be noted that the terms or words used in the present specification and the accompanying claims should not be limitedly interpreted as having their common meanings or those found in dictionaries. Therefore, the embodiments described in the present specification and constructions shown in the drawings are only the most preferable embodiments of the present invention, and are not representative of the entire technical spirit of the present invention. Accordingly, it should be understood that various equivalents and modifications capable of replacing the embodiments and constructions of the present invention might be present at the time at which the present invention was filed.

Hereinafter, the configuration and operation of a network intrusion detection apparatus using a Perl Compatible Regular Expressions (PCRE)-based pattern matching technique according to the present invention will be described in detail with reference to FIGS. 1 and 2.

FIG. 1 is a diagram showing the configuration of a network intrusion detection apparatus using a PCRE-based pattern matching technique according to the present invention.

Referring to FIG. 1, a network intrusion detection apparatus 10 using a PCRE-based pattern matching technique according to the present invention includes a detection rule converter 100, and a network processor 200 having a network processor core 220 and a Deterministic Finite Automata (DFA) engine 240.

The detection rule converter 100 converts a PCRE-based detection rule preset to detect an attack packet into a detection rule including a pattern to which only PCRE grammar corresponding to the DFA engine 240 is applied, and individually transfers the converted detection rule to the network processor core 220 and the DFA engine 240 of the network processor 200. The DFA engine 240 may not support all options of PCRE due to the complication of the PCRE grammar and the diversity of options. Therefore, the detection rule converter 100 converts the PCRE-based detection rule so that a pattern including only the PCRE grammar that can be supported by the DFA engine 240 is added to the PCRE-based detection rule, based on predefined regulations. That is, the detection rule converter 100 converts the preset PCRE-based detection rule so as to distinguish PCRE pattern matching performed by the network processor core 220 from PCRE pattern matching performed by the DFA engine 240, thus enabling PCRE pattern matching to be performed by the DFA engine 240 on a pattern including grammar supported by the DFA engine 240, and enabling PCRE pattern matching to be performed by the network processor core 220 on a pattern to which grammar that is not supported by the DFA engine 240 is applied. Meanwhile, the PCRE-based detection rule input to the detection rule converter 100 may be stored in a detection rule database (DB) (not shown) which is located inside or outside the network intrusion detection apparatus 10 according to the present invention. Further, the detection rule converter 100 individually transmits the converted PCRE-based detection rule to the network processor core 220 and to the DFA engine 240.

The network processor core 220 is installed in the network processor 200 and is configured to receive packets from the network and to transmit the payloads of the received packets to the DFA engine 240. Further, the network processor core 220 receives the results of the PCRE pattern matching on the payloads of the packets from the DFA engine 240, and selectively performs PCRE pattern matching on the payloads of the packets received from the network based on the PCRE-based detection rule converted by the detection rule converter 100, depending on the results of the PCRE pattern matching by the DFA engine 240. In this case, the network processor core 220 performs PCRE pattern matching only on the payload of a packet on which PORE pattern matching has been successfully performed by the DFA engine 240, based on the results of the PCRE pattern matching by the DFA engine 240. That is, the network processor core 220 is configured to, if PCRE pattern matching on the payload of the packet has been successfully performed by the DFA engine 240, and a pattern to which PCRE grammar, not corresponding to the DFA engine 240, is applied is present in the PCRE-based detection rule converted by the detection rule converter 240, perform again PCRE pattern matching on the payload of the packet using a software PCRE library and output the results of the PCRE pattern matching. However, if PCRE pattern matching on the payload of the packet has been unsuccessfully performed by the DFA engine 240, the network processor core 220 outputs the results of intrusion detection without performing PCRE pattern matching on the payload of the packet. In this case, the network processor core 220 may be implemented using a plurality of network processor cores so as to process large-capacity IP traffic on a high-speed network. Further, if necessary, the network processor core 220 may parse the header of the packet received from the network and manage flow information based on the parsed results.

The DFA engine 240 performs PCRE pattern matching on the payloads of the packets received from the network processor core 220 based on the PCRE-based detection rule converted by the detection rule converter 100 so that a pattern to which only PCRE grammar corresponding to the DFA engine 240 is applied is added to the PCRE-based detection rule. In this case, the DFA engine 240 stores a pattern, on which PCRE pattern matching is to be performed by the DFA engine 240 in the detection rule converted by the detection rule converter 100, that is, a pattern to which only PCRE grammar that can be supported by the DFA engine 240 is applied and which is added to the PCRE-based detection rule by the detection rule converter 100, in the internal or external memory (not shown) of the DFA engine 240 in the form of a graph for PCRE pattern matching. The DFA engine 240 searches the content of the payloads of the packets received from the network processor core 220 using the graph stored in the memory. Further, the DFA engine 240 transmits the results of the PCRE pattern matching obtained by performing the PCRE pattern matching on the payloads of the received packets based on the converted PCRE-based detection rule to the network processor core 220.

Figure 2:
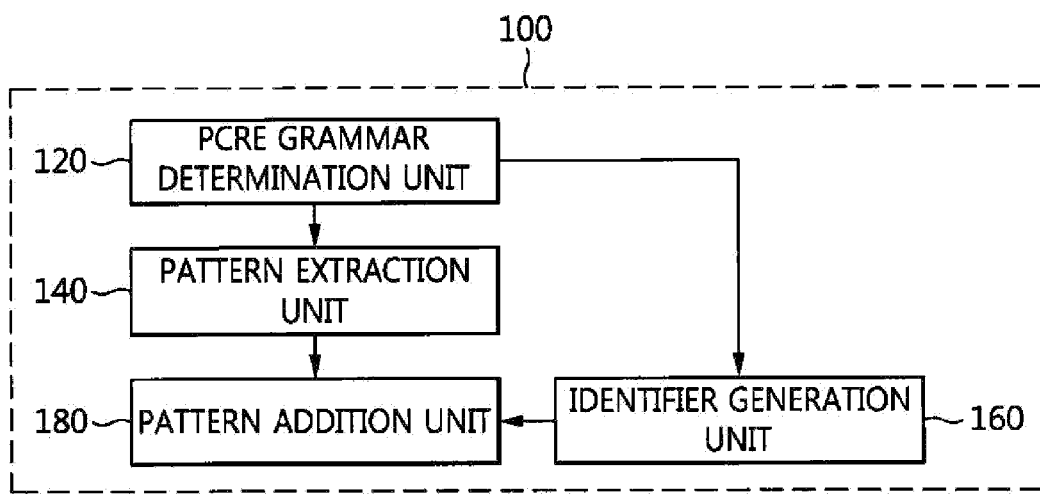
FIG. 2 is a diagram showing the configuration of a detection rule converter shown in FIG. 1.

FIG. 2 is a diagram showing the configuration of the detection rule converter 100 shown in FIG. 1.

Referring to FIG. 2, the detection rule converter 100 includes a PCRE grammar determination unit 120, a pattern extraction unit 140, an identifier generation unit 160, and a pattern addition unit 180.

The PCRE grammar determination unit 120 receives a PCRE-based detection rule for PCRE pattern matching on the payloads of packets, and determines whether a pattern to which grammar unrecognizable by the DFA engine 240 is applied is present in the received PCRE-based detection rule.

The pattern extraction unit 140 separately extracts the pattern to which PCRE grammar corresponding to the DFA engine 240 is applied from all patterns of the PCRE-based detection rule, based on the determination of the PCRE grammar determination unit 120. For example, when the PCRE-based detection rule for PCRE pattern matching is 'alert tcp 1.1.1.1 any→2.2.2.2 any (msg:"example"; pcre: "A\tBC\d";)', and the DFA engine 240 does not support the option '\d' of the PCRE grammar, the pattern extraction unit 140 extracts the pattern 'A\tBC' which is a pattern including only PCRE grammar supported by the DFA engine 240. Here, '\t' denotes an option indicating a tab character and '\d' denotes an option indicating a numeral between 0 and 9 in the PCRE grammar. Further, the pattern extraction unit 140 transmits the extracted pattern to the pattern addition unit 180.

The identifier generation unit 160 generates a separate identifier (e.g., pcre_dfa or the like) required to distinguish a pattern to which only PCRE grammar corresponding to the DFA engine 240 is applied from patterns to which existing PCRE grammar is applied in the PCRE-based detection rule converted by the pattern addition unit 180, based on the results of the determination by the PCRE grammar determination unit 120. Further, the identifier generation unit 160 transmits the generated identifier to the pattern addition unit 180.

The pattern addition unit 180 assigns the separate identifier generated by the identifier generation unit 160 to the pattern to which only PCRE grammar corresponding to the DFA engine 240 is applied and which is extracted by the pattern extraction unit 140, and then adds the resulting pattern to the existing PCRE-based detection rule. For example, when the PCRE-based detection rule for PCRE pattern matching is 'alert tcp 1.1.1.1 any→2.2.2.2 any (msg:"example"; pcre: "A\tBC\d";)', and the DFA engine 240 does not support the option '\d' of the PCRE grammar, the pattern addition unit 180 converts the PCRE-based detection rule into 'alert tcp 1.1.1.1 any→2.2.2.2 any (msg: "example"; pcre_dfa: "A\tBC"; pcre: "A\tBC\d";).' In this case, the pattern addition unit 180 individually transmits the converted PCRE-based detection rule to the network processor core 220 and to the DFA engine 240. Accordingly, in the PCRE-based detection rule converted by the pattern addition unit 180, PCRE pattern matching based on the pattern including only grammar recognizable by the DFA engine 240 (for example, pattern 'A \tBC' corresponding to 'pcre_dfa' identifier) may be performed by the DFA engine 240, and PCRE pattern matching based on the pattern including grammar unrecognizable by the DFA engine 240 (for example, the pattern 'A \tBC \d' corresponding to 'pcre' identifier) may be performed by the network processor core 220.

Hereinafter, a network intrusion detection method using a PCRE-based pattern matching technique according to the present invention will be described with reference to FIGS. 3 to 5. The description of some configuration overlapping the operation of the network intrusion detection apparatus using the PCRE-based pattern matching technique according to the present invention, which has been described with reference to FIGS. 1 and 2, will be omitted.

Figure 3:
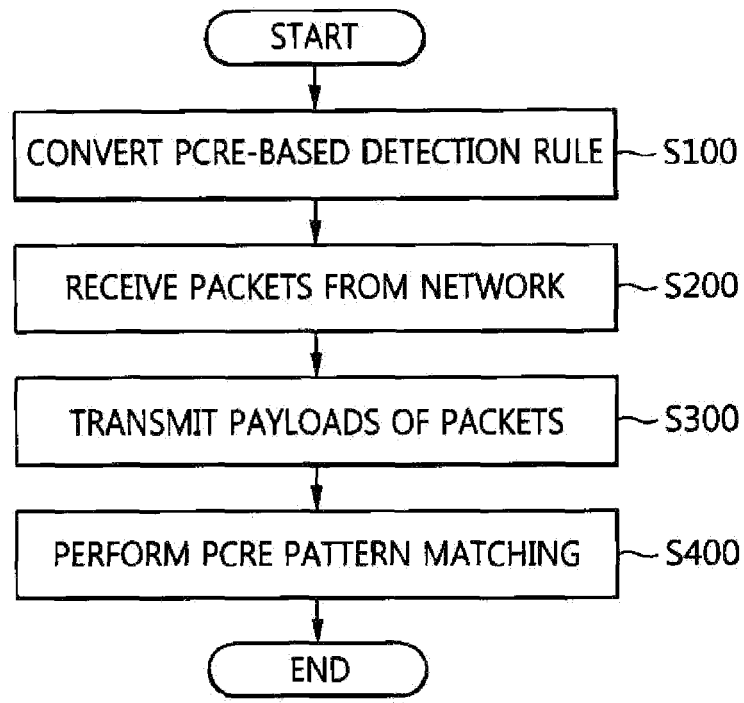
FIGS. 3 to 5 are flowcharts showing a network intrusion detection method using a PCRE-based pattern matching technique according to the present invention.

FIG. 3 is a flowchart showing a network intrusion detection method using a PCRE-based pattern matching technique according to the present invention.

Referring to FIG. 3, in the network intrusion detection method according to the present invention, the detection rule converter 100 first converts a PCRE-based detection rule preset to detect an attack packet into a detection rule including a pattern to which only PCRE grammar corresponding to the DFA engine 240 is applied at step S100.

Further, the network processor core 220 receives packets from the network at step S200, and transmits the payloads of the received packets to the DFA engine 240 at step S300.

Next, the DFA engine 240 performs PCRE pattern matching on the payloads of the packets received from the network processor core 220 at step S300, based on the PCRE-based detection rule converted by the detection rule converter 100 at step S100. Further, if PCRE pattern matching has been successfully performed by the DFA engine 240, and a pattern to which PCRE grammar unrecognizable by the DFA engine 240 is applied is present in the PCRE-based detection rule converted by the detection rule converter 100 at step S100, the network processor core 220 performs PCRE pattern matching only on the payload of a packet, on which PCRE pattern matching has been successfully performed by the DFA engine 240, among the payloads of the packets received from the network at step S200, at step S400.

Figure 4:
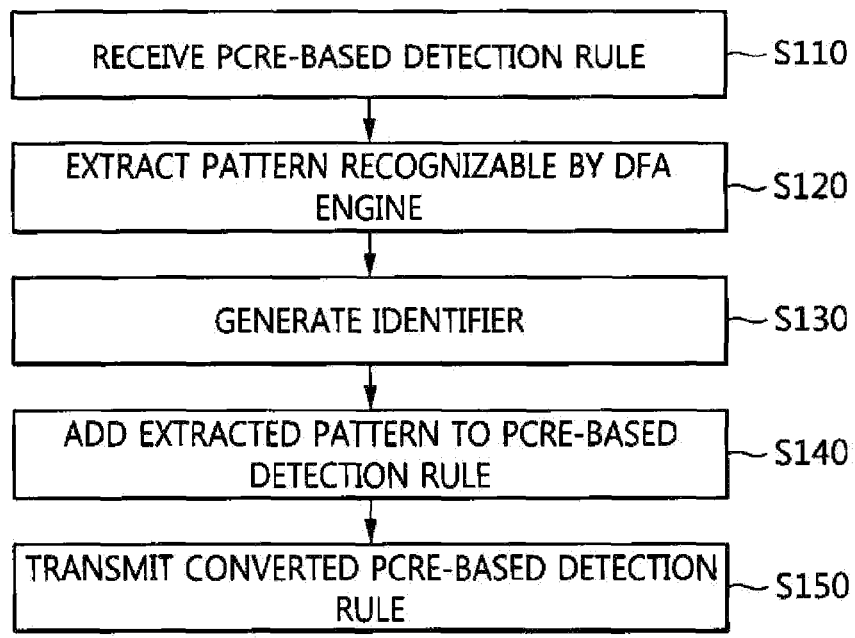

FIG. 4 is a flowchart showing step S100 shown in FIG. 3 in detail.

Referring to FIG. 4, at the step S100 of converting the PCRE-based detection rule into the detection rule recognizable by the DFA engine, the detection rule converter 100 first receives a preset PCRE-based detection rule from a detection rule database (DB) located inside or outside of the intrusion detection apparatus 10 at step S110.

Further, the pattern extraction unit 140 of the detection rule converter 100 separately extracts a pattern to which only grammar recognizable by the DFA engine 240 is applied, from all patterns of the PCRE-based detection rule received at step S110, at step S120.

Next, the identifier generation unit 160 of the detection rule converter 100 generates a separate identifier required to distinguish the pattern to which only grammar recognizable by the DFA engine 240 is applied and which is extracted at step S120 from patterns to which existing PCRE grammar is applied, in the PCRE-based detection rule converted by the pattern addition unit 180 at step S130.

Further, the pattern addition unit 180 of the detection rule converter 100 converts the PCRE-based detection rule received at step S110 into a PCRE-based detection rule including the pattern to which only PCRE grammar corresponding to the DFA engine 240 is applied, by assigning the separate identifier generated at step S130 to the pattern to which only PCRE grammar supported by the DFA engine 240 is applied and which is extracted at step S120, and by adding the resulting pattern to the existing PCRE-based detection rule, at step S140.

Finally, the detection rule converter 100 individually transmits the PCRE-based detection rule converted at step S140 to the network processor core 220 and to the DFA engine 240 at step S150.

Figure 5:
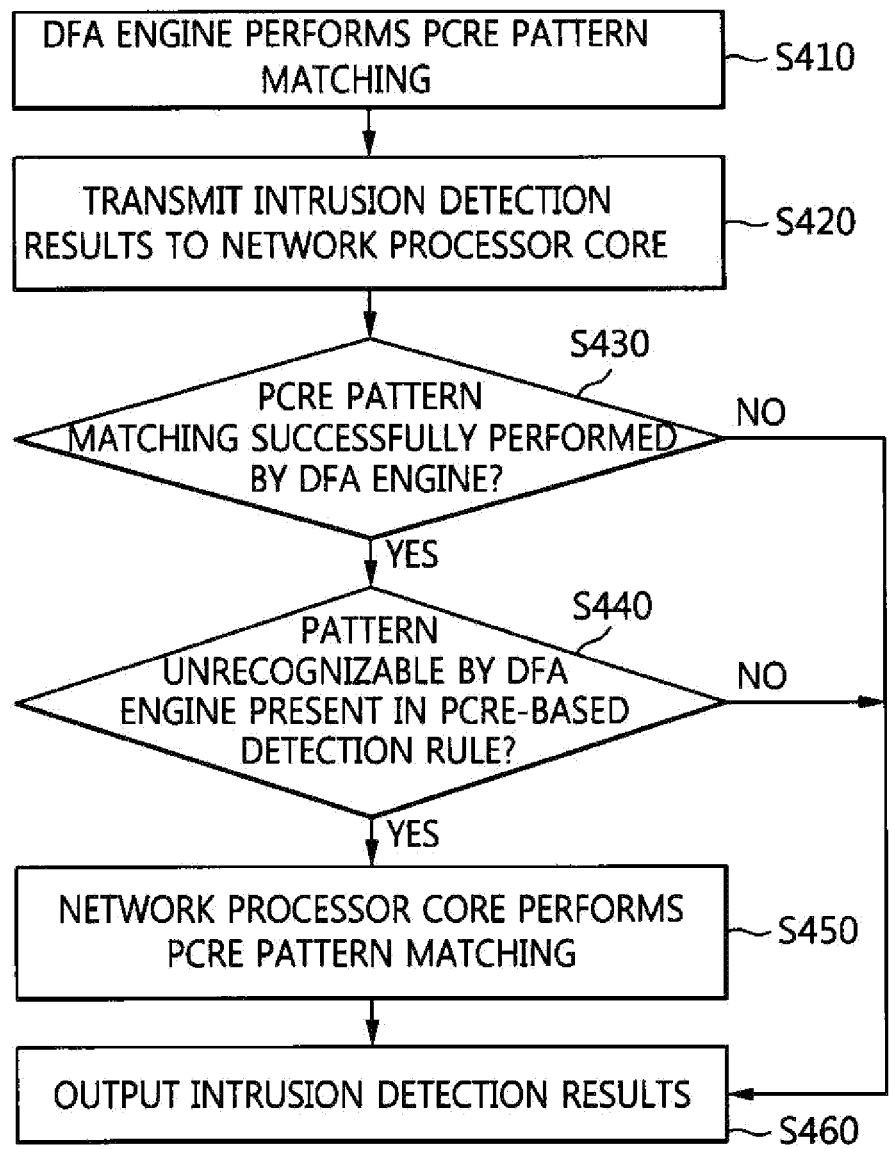

FIG. 5 is a flowchart showing step S400 shown in FIG. 3 in greater detail.

Referring to FIG. 5, the step S400 of performing PCRE pattern matching based on the converted PCRE-based detection rule is configured such that the DFA engine 240 first performs PCRE pattern matching on the payloads of the packets based on the converted PCRE-based detection rule received from the detection rule converter 100 at step S410, and transmits the results of intrusion detection as the results of the PCRE pattern matching on the payloads of the packets to the network processor core 220 at step S420.

Next, the network processor core 220 analyzes the results of the intrusion detection received from the DFA engine 240 at step S420, and determines whether PCRE pattern matching on the payload of the corresponding packet has been successfully performed by the DFA engine 240 at step S430.

If it is determined at step S430 that PCRE pattern matching on the payload of the packet has been successfully performed by the DFA engine 240, the network processor core 220 determines whether a pattern to which grammar unrecognizable by the DFA engine 240 is applied is present in the converted PCRE-based detection rule at step S440.

If it is determined at step S440 that the pattern to which grammar unrecognizable by the DFA engine 240 is applied is present in the converted PCRE-based detection rule, the network processor core 220 performs again PCRE pattern matching only on the payload of the packet on which PCRE pattern matching has been successfully performed by the DFA engine 240 among the payloads of packets, based on the converted PCRE-based detection rule, at step S450.

Further, the network processor core 220 outputs the results of intrusion detection as the results of PCRE pattern matching on the payload of the packet, performed at step S450, at step S460.

In contrast, if it is determined at step S430 that PCRE pattern matching on the payload of the corresponding packet has been unsuccessfully performed by the DFA engine 240, the network processor core 220 outputs the results of intrusion detection without performing PCRE pattern matching on the payload of the packet at step S460. In this case, the network processor core 220 may also use the results of the intrusion detection, received from the DFA engine 240 at step S420, as the results of the intrusion detection output at step S460.

Further, even if it is determined at steps S430 and S440 that PCRE pattern matching on the payload of the corresponding packet has been successfully performed by the DFA engine 240, but a pattern to which grammar unrecognizable by the DFA engine 240 is applied is not present in the converted PCRE-based detection rule, the network processor core 220 outputs the results of the intrusion detection without performing PCRE pattern matching on the payload of the packet at step S460. In this case, the network processor core 220 may also use the results of the intrusion detection, received from the DFA engine 240 at step S420, as the results of the intrusion detection output at step S460.

As describe above, by means of the above-described network intrusion detection technology using a PCRE-based pattern matching technique according to the present invention, when the intrusion of large-capacity IP traffic is detected in a high-speed network, PCRE pattern matching is performed in advance by a DFA engine based on hardware, thus improving processing speed. That is, through the conversion of a PCRE-based detection rule, the DFA engine performs in advance PCRE pattern matching on the payloads of packets, based on a pattern including PCRE grammar supported by the DFA engine among all PCRE patterns to be matched, thus minimizing the number of times that PCRE pattern matching is performed by a network processor core using a software PCRE library, and minimizing the leakage of packets of large-capacity IP traffic caused by PCRE pattern matching.

In accordance with the present invention, there is an advantage in that the DFA engine and the network processor core of a network processor perform in steps PCRE pattern matching on the payloads of packets collected from a network by changing a PCRE-based detection rule.

Further, in accordance with the present invention, there is an advantage in that the DFA engine of an expensive network processor is used for PCRE pattern matching, thus solving the problem of a conventional network processor having high cost per use, and in that PCRE pattern matching is performed based on hardware, thus improving the processing speed of the entire network processor.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A network intrusion detection apparatus comprising:
 a non-transitory computer-readable medium recording programs for realizing following functions, the functions comprising:
 a network processor core for receiving packets from a network, and transmitting payloads of the received packets to a Deterministic Finite Automata (DFA) engine;
 a detection rule converter for converting a Perl Compatible Regular Expressions (PCRE)-based detection rule, preset to detect an attack packet, into a detection rule including a pattern to which only PCRE grammar corresponding to the DFA engine is applied, so that the DFA en performs matching on a pattern including PCRE grammar supported by the DFA engine, and the network processor core performs PCRE pattern matching on a pattern to which PCRE grammar not supported by the DFA engine is applied; and
 the DFA engine for performing PCRE pattern matching on the payloads of the packets based on the detection rule converted by the detection rule converter,
 wherein the DFA engine performs PCRE pattern matching based on hardware, while the network processor core performs PCRE pattern matching based on software using PCRE library.

2. The network intrusion detection apparatus of claim 1, wherein the detection rule converter extracts the pattern to which only the PCRE grammar corresponding to the DFA engine is applied, from all patterns of the PCRE-based detection rule, adds the extracted pattern to the PCRE-based detection rule, and then converts the PCRE-based detection rule into the detection rule including the pattern to which only the PCRE grammar corresponding to the DFA engine is applied.

3. The network intrusion detection apparatus of claim 2, wherein the DFA engine performs PCRE pattern matching on the payloads of the packets based on the pattern to which only the PCRE grammar corresponding to the DFA engine is applied and which is added to the PCRE-based detection rule.

4. The network intrusion detection apparatus of claim 3, wherein the network processor core performs PCRE pattern matching only on a payload of a packet on which PCRE pattern matching has been successfully performed by the DFA engine.

5. The network intrusion detection apparatus of claim 4, wherein the network processor core is configured to, if PCRE pattern matching has been successfully performed by the DFA engine, and a pattern to which PCRE grammar, not corresponding to the DFA engine, is applied is present in the PCRE-based detection rule, perform PCRE pattern matching only on a payload of a packet on which PCRE pattern matching has been successfully performed by the DFA engine among the payloads of the packets received from the network.

6. The network intrusion detection apparatus of claim 5, wherein the network processor core does not perform PCRE pattern matching on the payloads of the packets received from the network if PCRE pattern matching has been unsuccessfully performed by the DFA engine.

7. The network intrusion detection apparatus of claim 6, wherein the network processor core performs PCRE pattern matching on the payloads of the packets received from the network using a PCRE library.

8. The network intrusion detection apparatus of claim 2, wherein the detection rule converter assigns a separate identifier to the extracted pattern so as to distinguish the extracted pattern from patterns to which PCRE grammar, not corresponding to the DFA engine, is applied, and adds a resulting pattern to the PCRE-based detection rule.

9. A network intrusion detection method comprising:
 converting a Perl Compatible Regular Expressions (PCRE)-based detection rule, preset to detect an attack packet, into a detection rule including a pattern to which only PCRE grammar corresponding to a DFA engine is applied, so that the DFA engine performs PCRE pattern matching on a pattern including PCRE grammar supported by the DFA engine, and a network processor core performs PCRE pattern matching on a pattern to which PCRE grammar not supported by the DFA engine is applied;
 receiving, by the network processor core, packets from a network;
 transmitting, by the network processor core, payloads of the received packets to the DFA engine; and
 performing, by the DFA engine, PCRE pattern matching on the payloads of the packets based on the converted detection rule,
 wherein the DFA engine performs PCRE pattern matching based on hardware while the network processor core performs PCRE pattern matching based on software using PCRE library.

10. The network intrusion detection method of claim 9, wherein converting the PCRE-based detection rule into the detection rule including the pattern to which only PCRE grammar corresponding to the DFA engine is applied comprises:

extracting the pattern to which only the PCRE grammar corresponding to the DFA engine is applied, from all patterns of the PCRE-based detection Me; and adding the extracted pattern to the PCRE-based detection rule, and then converting the PCRE-based detection rule into the detection rule including the pattern to which only the PCRE grammar corresponding to the DFA engine is applied.

11. The network intrusion detection method of claim 10, wherein performing, by the DFA engine, the PCRE pattern matching on the payloads of the packets is configured to perform PCRE pattern matching on the payloads of the packets based on the pattern to which only the PCRE grammar corresponding to the DFA engine is applied and which is added to the PCRE-based detection rule.

12. The network intrusion detection method of claim 11, further comprising:

performing, by the network processor core, PCRE pattern matching only on a payload of a packet on which PCRE pattern matching has been successfully performed by the DFA engine.

13. The network intrusion detection method of claim 12, wherein performing, by the network processor core, the PCRE pattern matching only on the payload of the packet on which PCRE pattern matching has been successfully performed by the DFA engine is configured to, if PCRE pattern matching has been successfully performed by the DFA engine, and a pattern to which PCRE grammar, not corresponding to the DFA engine, is applied is present in the PCRE-based detection rule, perform PCRE pattern matching only on a payload of a packet on which PCRE pattern matching has been successfully performed by the DFA engine among the payloads of the packets received from the network.

14. The network intrusion detection method of claim 13, wherein performing, by the network processor core, the PCRE pattern matching only on the payload of the packet on which PCRE pattern matching has been successfully performed by the DFA engine is configured such that, if PCRE pattern matching has been unsuccessfully performed by the DFA engine, PCRE pattern matching is not performed on the payloads of the packets received from the network.

15. The network intrusion detection method of claim 14, wherein performing, by the network processor core, the PCRE pattern matching only on the payload of the packet on which PCRE pattern matching has been successfully performed by the DFA engine is configured to perform PCRE pattern matching on the payloads of the packets received from the network using a PCRE library.

16. The network intrusion detection method of claim 10, wherein adding the extracted pattern to the PCRE-based detection rule and then converting the PCRE-based detection rule into the detection rule including the pattern to which only the PCRE grammar corresponding to the DFA engine is applied is configured to assign a separate identifier to the extracted pattern so as to distinguish the extracted pattern from patterns to which PCRE grammar, not corresponding to the DFA engine, is applied, and add a resulting pattern to the PCRE-based detection rule.

* * * * *